United States Patent [19]

Aldrich

[11] 4,263,182
[45] Apr. 21, 1981

[54] STABLE DISPERSIONS OF FORTIFIED ROSIN

[75] Inventor: Paul H. Aldrich, London Britton Township, Chester County, Pa.

[73] Assignee: Hercules Incorporated, Wilmington, Del.

[21] Appl. No.: 177,970

[22] Filed: Aug. 14, 1980

[30] Foreign Application Priority Data

Sep. 6, 1979 [GB] United Kingdom ............... 30904/79

[51] Int. Cl.³ .......................... C08L 3/04; C08L 93/04
[52] U.S. Cl. ........................................ 260/9; 260/17.3; 260/17.4 ST; 260/24; 260/27 R
[58] Field of Search ............... 260/27 R, 24, 9, 17.3, 260/17.4 ST

[56] References Cited

U.S. PATENT DOCUMENTS

| | | | |
|---|---|---|---|
| 2,628,918 | 2/1953 | Wilson et al. | 106/238 |
| 2,684,300 | 7/1954 | Wilson et al. | 106/238 |
| 2,926,116 | 2/1960 | Keim | 260/29.2 EP |
| 2,926,154 | 2/1960 | Keim | 260/29.2 EP |
| 3,070,452 | 12/1962 | Harris et al. | 106/213 |
| 3,130,118 | 4/1964 | Chapman | 106/213 |
| 3,526,524 | 9/1970 | Kulick | 260/24 |
| 3,565,755 | 2/1971 | Davison | 106/238 |
| 3,700,623 | 10/1972 | Keim | 260/37 N |
| 3,966,654 | 6/1976 | Aldrich | 260/24 |
| 3,989,659 | 11/1976 | Aldrich et al. | 260/24 |
| 4,199,369 | 4/1980 | Hughes et al. | 106/238 |
| 4,203,776 | 5/1980 | Greiner | 106/238 |

*Primary Examiner*—H. S. Cockeram

[57] ABSTRACT

Disclosed are novel aqueous dispersions which consist essentially of finely-divided fortified rosin particles; a water-soluble or water-dispersible cationized starch dispersing agent for the finely-divided fortified rosin particles; an anionic surface-active agent; and water. The novel aqueous dispersions are used to size paper.

23 Claims, No Drawings

STABLE DISPERSIONS OF FORTIFIED ROSIN

This invention relates to novel aqueous dispersions of fortified rosin. Particularly, this invention relates to aqueous dispersions which consist essentially of finely-divided fortified rosin particles, a water-soluble or water-dispersible cationized starch dispersing agent for the finely-divided fortified rosin particles, an anionic surface-active agent, and water. The cationized starch dispersing agent will be detailed more fully hereinafter. The novel fortified rosin dispersions of this invention are used to size paper.

U.S. Pat. No. 3,966,654 discloses aqueous fortified rosin dispersions consisting essentially of, by weight, (A) from about 5% to about 50% fortified rosin, (B) from about 0.5% to about 10% of water-soluble cationic resin dispersing agent, and (C) water to 100%. Dispersing agent (B) is selected from the group consisting of (i) a water-soluble aminopolyamideepichlorohydrin resin, (ii) a water-soluble alkylenepolyamineepichlorohydrin resin and (iii) a water-soluble poly(diallylamine)-epichlorohydrin resin. The fortified rosin is the adduct reaction product of rosin and an acidic compound containing the

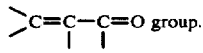

Also disclosed are methods of preparing the dispersions.

U.S. Pat. No. 3,966,654 also discloses prior art relating to aqueous fortified rosin dispersions. The disclosure of this patent, U.S. Pat. No. 3,966,654, is incorporated herein by reference.

U.S. Pat. Nos. 4,199,396 and 4,203,776 also disclose aqueous fortified rosin dispersions prepared by an inversion process. Prior art dispersions and methods of making the same are also disclosed. The disclosures of U.S. Pat. Nos. 4,199,396 and 4,203,776 are incorporated herein by reference.

U.S. Pat. Nos. 3,070,542 and 3,130,118 disclose the use of certain cationic starches in the preparation of aqueous ketene dimer emulsions. The emulsions are used to size paper.

Commerically available aqueous dispersions of fortified rosin particles for use in sizing paper cannot be stored for long periods of time because the fortified rosin particles tend to settle out on long standing and also have a tendency to agglomerate under conditions of agitation and shear such as that encountered in pumping the dispersions from their place of storage to their place of use.

The aqueous dispersions of this invention have excellent storage stability and are more resistant to particle agglomeration due to agitation and shear as encountered in pumping, for example.

In accordance with this invention there are provided aqueous dispersions of fortified rosin, adapted for use in the sizing of paper, which consist essentially of, by weight, (A) from about 5% to about 50% fortified rosin; (B) from about 0.5% to about 10% of at least one water-soluble or water-dispersible cationized starch dispersing agent; (C) from about 0.1% to 4% of at least one anionic surface active agent; and (D) water to 100%, component (B) being selected from (I) an anionic starch modified by reaction with a cationizing resin selected from the group consisting of (a) a water-soluble aminopolyamideepihalohydrin resin containing no epoxy groups, (b) a water-soluble alkylenepolyamineepihalohydrin resin, (c) a water-soluble poly(diallyamine)-epihalohydrin resin containing no epoxy groups, (d) a water-soluble poly(diallyamine) resin, (e) a water-soluble poly(alkylenimine) resin, and (f) a water-soluble poly(alkylenimine)-epihalohydrin resin, and (II) starch modified by reaction with a water-soluble cationizing resin containing epoxy groups selected from the group consisting of (a) a water-soluble poly(N-alkyldiallylamine)-epihalohydrin resin containing epoxy groups, and (b) a water-soluble aminopolyamide-epihalohydrin resin containing epoxy groups, the aminopolyamide moiety of which contains tertiary amines, said fortified rosin (A) being the adduct reaction product of rosin and an acidic compound containing the

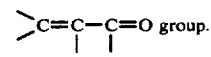

In its preferred embodiment, the composition described above will consist essentially of from about 10% to about 40% component (A); from about 1% to about 8% component (B); from about 0.2% to about 2% component (C); and (D) water to 100%.

The fortified rosin can be extended if desired by known extenders therefor such as waxes (particularly paraffin wax and microcrystalline wax); hydrocarbon resins including those derived from petroleum hydrocarbons and terpenes; and the like. This is accomplished by melt blending or solution blending with the fortified rosin from about 10% to about 100% by weight, based on the weight of fortified rosin, of the fortified rosin extender.

Also blends of fortified rosin and rosin; and blends of fortified rosin, rosin and rosin extender can be used.

Fortified rosin-rosin blends will comprise about 25% to 95% fortified rosin and about 75% to 5% rosin. Blends of fortified rosin, rosin, and rosin extender will comprise about 25% to 45% fortified rosin, about 5% to 50% rosin, and about 5% to 50% rosin extender.

The aqueous fortified rosin dispersions of this invention can be prepared by homogenizing a solution or a melt of the fortified rosin or by the so-called inversion process.

In preparing the aqueous fortified rosin dispersions of this invention by the solution process, the fortified rosin (including the extender or rosin or both if either or both are employed) is first dissolved in a water-immiscible organic solvent therefor such, for example, as benzene, xylene, methylene chloride, chloroform, or 1,2-dichloropropane. Mixtures of two or more solvents can be used if desired. The selected solvent will also be non-reactive with the components of the aqueous dispersion to be subsequently prepared.

An emulsion is prepared which is comprised of the organic solvent-fortified rosin solution as the dispersed phase and, as the continuous phase, an aqueous solution or dispersion of cationized starch dispersing agent and anionic surface active agent. The essentially unstable aqueous emulsion is then subjected to extreme shear to provide an essentially stable emulsion. Extreme shear is conveniently accomplished by means of an homogenizer. Thus, passing, at least once, the unstable aqueous emulsion through an homogenizer under a pressure on the order of from about 1000 p.s.i.g. to about 8000 p.s.i.g., will provide an essentially stable emulsion. Subsequently, the organic solvent component of the emulsion is removed from the emulsion, as by vacuum distillation, and there is provided an essentially stable aqueous dispersion of fortified rosin particles. These procedural steps are described in U.S. Pat. No. 3,565,755, the disclosure of which is hereby incorporated by reference.

In preparing dispersions of this invention by the melt process, the fortified rosin is heated, under pressure if required, in admixture with an aqueous solution of cationized starch dispersing agent and anionic surface active agent. The unstable aqueous dispersion is heated to a temperature of from about 80° C. to about 195° C. Agitation thereof during the time required to reach the necessary temperature is recommended. The heated dispersion is then subjected to extreme shear, whereby there is provided an essentially stable aqueous dispersion. Extreme shear is conveniently accomplished by means of an homogenizer. Thus, passing, at least once, the heated mixture through an homogenizer under a pressure on the order of about 2000 p.s.i.g. to about 8000 p.s.i.g. will provide an essentially stable dispersion. The pressure selected is within the skill of the art.

The aqueous fortified rosin dispersions of this invention can also be prepared by an inversion process. The fortified rosin is admixed with an aqueous solution of cationized starch dispersing agent and anionic surface active agent in an amount to provide a water-in-oil emulsion which is subsequently inverted to a oil-in-water emulsion by the rapid addition of water with vigorous stirring.

ROSIN

The rosin used to prepare the fortified rosin employed in this invention can be any of the commerically available types of rosin, such as wood rosin, gum rosin, tall oil rosin, and mixtures of any two or more, in their crude or refined state. Partially or substantially completely hydrogenated rosins and polymerized rosins, as well as rosins that have been treated to inhibit crystallization such as by heat treatment or reaction with formaldehyde, can be employed.

The fortified rosin employed is the adduct reaction product of rosin and an acidic compound containing the

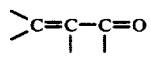

group and is derived by reacting rosin and the acidic compound at elevated temperatures of from about 150° C. to about 210° C.

The amount of acidic compound employed will be that amount which will provide fortified rosin containing from about 1% to about 12% by weight of adducted acidic compound based on the weight of the fortified rosin. Methods of preparing fortified rosin are disclosed and described in U.S. Pat. Nos. 2,628,918 and 2,684,300, reference to which is hereby made.

Examples of acidic compounds containing the

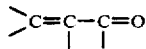

group that can be used to prepare the fortified rosin include the alpha-beta-unsaturated organic acids and their available anhydrides, specific examples of which include fumaric acid, maleic acid, acrylic acid, maleic anhydride, itaconic acid, itaconic anhydride, citraconic acid and citraconic anhydride. Mixtures of acids can be used to prepare the fortified rosin if desired. Thus, for example, a mixture of the acrylic acid adduct of rosin and the fumaric acid adduct can be used to prepare the novel dispersions of this invention. Also, fortified rosin that has been substantially completely hydrogenated after adduct formation can be used.

If rosin (that is, unfortified rosin) is used in combination with fortified rosin, it can be any of the commercially available types of rosin, such as wood rosin, gum rosin, tall oil rosin, and mixtures of any two or more, in their crude or refined state. Partially or substantially completely hydrogenated rosins and polymerized rosins, as well as rosin that have been treated to inhibit crystallization such as by heat treatment or reaction with formaldehyde, can be employed.

CATIONIZED STARCH DISPERSING AGENTS

The dispersing agents used in this invention are water-soluble or water-dispersible cationized starches selected from (I) anionic starches modified by reaction with a cationizing resin selected from the group consisting of (a) a water-soluble aminopolyamide-epihalohydrin resin containing no epoxy groups, (b) a water-soluble alkylenepolyamine-epihalohydrin resin, (c) a water-soluble poly(diallylamine)-epihalohydrin resin containing no epoxy groups, (d) a water-soluble poly(diallylamine) resin, (e) a water-soluble poly(alkylenimine) resin, or (f) a water-soluble poly(alkylenimine)-epihalohydrin resin; and (II) starch modified by reaction with a water-soluble polyamine resin containing epoxy groups. Examples of such resins are water-soluble poly(N-alkyldiallylamine)-epihalohydrin resins containing epoxy groups; and water-soluble aminopolyamide-epihalohydrin resins containing epoxy groups, the aminopolyamide moiety of which contains tertiary amines.

DISPERSING AGENTS (I)

As above set forth, dispersing agents (I) are anionic starches modified by reaction or combination with a cationizing resin as described. The precise nature of the reaction, or the combining of the anionic starch with the cationizing resin is not fully understood and it is not the intention of applicant to be bound to any particular theory. However, it is believed that the anionic starch and the cationizing resin are tied by ionic bonding.

Anionic Starches

The anionic starch employed can be (1) any of the natural starches containing phosphate groups such, for example, as potato starch, or (2) starches into which carboxyl groups have been introduced by oxidation such, for example, as by reaction with with sodium hypochlorite, or (3) starches that have been modified by carboxymethylation, or (4) starches into which phosphate groups have been introduced as by reaction with a sodium acid phosphate.

Starches containing carboxyl groups are prepared by means well known in the art and are available commerically. For the purposes of this invention, it is preferred to use carboxylated starches containing at least one milliequivalent of carboxyl per 100 grams starch, the upper practical limit being about 15 millieqivalents of carboxyl per 100 grams starch.

Starches into which carboxyl groups can be introduced via oxidation include those derived from a plant source such as corn, potato, wheat, rice, sago, tapioca, waxy maize, sorghum, and high amylose corn.

One common method of oxidizing starches to introduce carboxyl groups entails the addition of a predetermined quantity of sodium hypochlorite to an aqueous starch slurry. Alkali is added to maintain the pH at 8–10 throughout the reaction and cooling is used to maintain the temperature in the range 21°–38° C. The amount of hypochlorite added is usually equivalent to between 0.5 and 6.0% available chlorine, based on starch. Since the viscosity of the starch is inversely related to the degree of oxidation, the amount of hypochlorite is often chosen based on the desired viscosity of the starch to be made. Following a reaction period of 5–24 hours, the slurry is neutralized and free chlorine is destroyed with sodium bisulfite. Soluble by-products are then removed and the starch is collected on vacuum filters and dried.

As to starches containing phosphate groups, it is preferred to use those containing at least one milliequivalent of phosphate per 100 grams starch, the upper practical limit being about 15 milliequivalents of phosphate per 100 grams starch. Starches into which phosphate groups have been introduced are well known in the art as are their methods of preparation.

Starches that have been modified by carboxymethylation are known in the art as are their methods of preparation.

Cationizing Resin (a)

As cationizing resin (a) there can be employed the water-soluble aminopolyamide-epihalohydrin resins disclosed in U.S. Pat. Nos. 2,926,116 and 2,926,154 and 3,966,654. The disclosures of these patents are incorporated herein by reference.

In preparing resin (a) there is first prepared a water-soluble aminopolyamide resin which is derived by reaction of a dicarboxylic acid and a polyalkylene polyamine in a mole ratio of polyalkylene polyamine to dicarboxylic acid of from about 0.8:1 to about 1.4:1.

Particularly suitable dicarboxylic acids are diglycolic acid and saturated aliphatic dicarboxylic acids containing from 4 through 10 carbon atoms such as succinic acid, glutaric acid, adipic acid, pimelic acid, suberic acid, azelaic acid, and sebacic acid.

Other suitable dicarboxylic acids include terephthalic acid, isophthalic acid, phthalic acid, maleic acid, fumaric acid, itaconic acid, glutaconic acid, citraconic acid, and mesaconic acid.

The available anhydrides of the above acids can be used in preparing the water-soluble aminopolyamide as well as the esters of the acids. Mixtures of two or more dicarboxylic acids, their anhydrides, and their esters can be used to prepare the water-soluble aminopolyamide, if desired.

The polyalkylene polyamine employed in preparing the aminopolyamide is represented by the formula

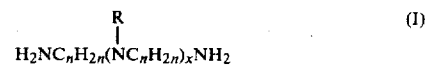

$$H_2NC_nH_{2n}(NC_nH_{2n})_xNH_2 \quad (I)$$

where R is hydrogen or $C_1$–$C_4$ alkyl; n is an integer 2 through 6 and x is a integer 1 through 4. Examples of $C_1$–$C_4$ alkyl are methyl, ethyl, propyl, isopropyl, n-butyl, isobutyl and t-butyl.

Specific examples of polyalkylene polyamines of the above formula include diethylenetriamine; triethylenetetramine; tetraethylenepentamine; dipropylenetriamine; dihexamethylenetriamine; pentaethylenehexamine; methyl bis(3-aminopropyl)amine; methyl bis(2-aminoethyl)amine; and 4,7-dimethyltriethylenetetramine. Mixtures of polyalkylene polyamines can be used, if desired.

The spacing of amino groups on the aminopolyamide can be increased if desired. This can be accomplished by substituting a diamine such as ethylenediamine, propylenediamine, hexamethylenediamine and the like for a portion of the polyalkylene polyamine. For this purpose, up to about 80% of the polyalkylene polyamine can be replaced by a molecularly equivalent amount of diamine. Usually, a replacement of about 50% or less will be adequate.

Temperatures employed for carrying out reaction between the dicarboxylic acid and the polyalkylene polyamine can vary from about 110° C. to about 250° C. or higher at atmospheric pressure. For most purposes, temperatures between about 160° C. and 210° C. are preferred. The time of reaction will usually vary from about ½ hour to 2 hours. Reaction time varies inversely with reaction temperatures employed.

In carrying out the reaction, it is preferred to use an amount of dicarboxylic acid sufficient to react substantially completely with the primary amine groups of the polyalkylene polyamine but insufficient to react with the secondary amine groups and/or tertiary amine groups to any substantial extent. This will usually require a mole ratio of polyalkylene polyamine to dicarboxylic acid of from about 0.9:1 to about 1.2:1. However, mole ratios of from about 0.8:1 to about 1.4:1 can be used.

Aminopolyamides containing secondary amine groups can be alkylated so as to replace the secondary amine groups by tertiary amine groups. This is accomplished by means of a monofunctional alkylating agent such as lower alkyl esters of mineral acids such as the halides, sulfates and phosphates, substituted alkylhalides. Illustrative of the compounds which can be used are dimethyl, diethyl and dipropyl sulfate; methyl chloride; methyl iodide; ethyl iodie; methyl bromide; propyl bromide; and the mono-, di- or tri-methyl, ethyl and propyl phosphates. Certain aromatic compounds such as benzyl chloride and methyl p-toluene sulfonate can be used. From about 0.1 mole to about 0.9 mole of monofunctional alkylating agent for each amine group can be used. Alkylation conditions are well known in the art and form no part of this invention.

Cationizing resin (a) is derived by reacting a water-soluble aminopolyamide, as above described, with an epihalohydrin, such as epichlorohydrin, at a temperature of from about 45° C. to about 100° C., and preferably between about 45° C. and 70° C., until the viscosity of a 20% solids solution in water at 25° C. has reached about C or higher on the Gadner-Holdt scale. This reaction is preferably carried out in aqueous solution.

pH adjustment is usually not necessary. However, since the pH decreases during the polymerization phase of the reaction, it may be desirable, in some cases, to add alkali to combine with at least some of the acid formed. When the desired viscosity is reached, water can be added to adjust the solids content of the resin solution to a desired amount, usually from about 2% to about 50%.

In the aminopolyamide-epichlorohydrin reaction, satisfactory results can be obtained utilizing from about 1.0 mole to about 5 moles of epichlorohydrin for each secondary or tertiary amine group of the aminopolyamide, and preferably from about 1 mole to about 1.5 moles of epichlorohydrin.

Aminopolyamide-epihalohydrin resins where the aminopolyamide moiety contains tertiary amine nitrogens can contain halohydrin groups of epoxy groups depending on solution pH. For the purposes of preparing dispersing agent (I), it is important that this resin contain halohydrin groups and no epoxy groups. This is accomplished by acid-stabilization of the resin in accordance with the teachings of U.S. Pat. No. 3,311,594, the disclosure of which is incorporated by reference.

In all the examples herein, all parts and percentages are by weight unless otherwise specified.

The following example is illustrative of a method for the preparation of a resin of the cationizing resin (a) type.

EXAMPLE A an aminopolyamide is formed by adding 219.3 parts of adipic acid slowly, with stirring, to 151.3 parts of diethylenetriamine in a flask fitted with a stirrer and a condenser for collecting water distillate. The reaction mixture is stirred and heated at 170°–180° C. under a nitrogen blanket until amide formation is complete. After air cooling to approximately 140° C., hot water is added with stirring to provide a 50% solids aqueous solution of aminopolyamide resin with an intrinsic viscosity of 0.140 measured by using a 2% solution in 1 N NH$_4$Cl. An epichlorohydrin derivative of the aminopolyamide is prepared by adding about 110 parts of water to about 50 parts of the 50% solids solution and then adding 14.0 parts (0.157 mole) of epichlorohydrin. The reaction mixture is heated at 70° C. with stirring under a reflux condenser until the Gardner-Holdt viscosity attains a value of E to F. The reaction mixture is diluted with water to a solids content to about 12.5%. A 12.5% aqueous solution of a resin prepared substantially in accordance with the method of this example is available commercially under the trademark Kymene and grade designation 557H.

Cationizing Resin (b)

Cationizing resin (b) is the water-soluble alkylene polyamine-epihalohydrin resin derived by reaction of an epihalohydrin, epichlorohydrin being preferred, and an alkylene polyamine. Water-soluble alkylenepolyamine-epihalohydrin resins and their method of preparation are well known in the art.

Alkylene polyamines which can be reacted with epichlorohydrin are polyalkylene polyamines having the formula (I) above and monoalkylene polyamines such as ethylenediamine, propylenediamine, and hexamethylenediamine.

The relative proportions of alkylene polyamine and epichlorohydrin employed can be varied depending upon the particular polyalkylene polyamine used. In general, it is preferred that the molar ratio of epichlorohydrin to alkylene polyamine be in excess of 1:1 and less than 2:1. In the preparation of a water-soluble resin from epichlorohydrin and tetraethylenepentamine, good results are obtained at molar ratios of from about 1.4:1 to 1.94:1. Reaction temperature is preferably in the range of from about 40° C. to about 60° C.

The following example is illustrative of a method for the preparation of a resin of the cationizing resin (b) type.

EXAMPLE B

To a mixture of 29.2 parts triethylenetetramine and 70 parts water is added 44.4 parts epichlorohydrin over a period of about 12 minutes with periodic cooling. After the epichlorohydrin addition is complete, the reaction mixture is heated to 75° C. and maintained at a temperature of from about 70° C. to about 77° C. for about 33 minutes, at which point the Gardner-Holdt viscosity reaches about I. The resulting reaction mass is diluted with 592 parts water to provide an aqueous solution that has a solids content of about 11.7% and a pH of about 6.3.

Cationizing Resins (c) and (d)

Cationizing resin (c) is a water-soluble poly(diallylamine)-epihalohydrin resin. Resins of this type and their method of preparation are described in U.S. Pat. No. 3,700,623. The disclosure of this patent is incorporated herein by reference. Resins of this type are also disclosed in Canadian Pat. No. 999,300.

A poly(diallylamine)-epihalohydrin resin is the reinous reaction product of (i) a water-soluble linear polymer produced by polymerizing the hydrohalide salt of a diallylamine of the formula

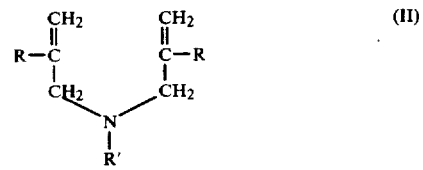

where R is hydrogen or lower alkyl and R' is hydrogen or alkyl, either alone or as a mixture with other copolymerizable ingredients, in the presence of a free radical catalyst followed by neutralization of the salt to give the polymer free base and (ii) an epihalohydrin, epichlorohydrin being preferred.

The water-soluble linear polymer (unreacted with epihalohydrin) is used as cationizing resin (d).

In the above formula, each R can be the same or different and the alkyl groups contain from 1 to 3 carbons and are preferably methyl, ethyl or isopropyl. R' of the formula represents hydrogen or alkyl groups. The R' alkyl groups will contain from 1 to 6 carbon atoms such as methyl, ethyl, propyl, isopropyl, butyl, tert-butyl and hexyl.

Diallyamines and N-alkyldiallylamines are well known in the art, as are their methods of preparation.

Specific hydrohalide salts which can be polymerized to provide the water-soluble polymer include diallylamine hydrochloride and N-methyldiallylamine hydrochloride. Other salts are disclosed in U.S. Pat. No. 3,700,623.

For the purpose of this invention homopolymers of diallylamines such, for example, as poly(N-methyldiallylamine) are preferred as they are readily available.

However, copolymers of two or more different diallylamines or copolymers containing at least one other copolymerizable monomer which is not a diallylamine can be used. Typically, the comonomer is a different diallylamine; a monoethylenically unsaturated compound containing a single vinyl or vinylidene group; or sulfur dioxide. Specific comonomers and specific copolymers are disclosed in U.S. Pat. No. 3,700,623.

The epihalohydrin, preferably epichlorohydrin, is used in an amount ranging from about 0.5 mole to about 1.5 moles and preferably about 1 mole to about 1.5 moles per mole of secondary plus tertiary amine present in the polymer.

Resin (c) can be prepared by reacting a homopolymer or copolymer of a diallylamine with epichlorohydrin at a temperature of from about 30° C. to about 80° C. and preferably from about 40° C. to about 60° C. until the viscosity measured on a solution containing 20% to 30% solids at 25° C. has reached a range of A to E and preferably about C to D on the Gardner-Holdt scale. The reaction is desirably carried out in aqueous solution to moderate the reaction, and at a pH of from about 7 to about 9.5. When the desired viscosity is reached, sufficient water is added to adjust the solids content of the resin solution to about 15% or less and the product cooled to room temperature (about 23° C.).

As prepared, aqueous solutions of poly(N-alkyldiallylamine)-epihalohydrin resins, such as poly(N-methyldiallylamine)-epichlorohydrin resin, contain epoxy groups which are reactive and thus the resins in solution have a tendency toward gelation. Stabilization against gelation is accomplished by adding to the aqueous resin solution sufficient water-soluble acid (such as hydrochloric acid and sulfuric acid) to obtain and maintain a solution pH of about 2. This acid treatment results in conversion of substantially all the reactive epoxy groups to unreactive halohydrin groups.

The unreactive halohydrin groups are converted to reactive epoxy groups by the addition of a base, such as sodium hydroxide, in an amount sufficient to accomplish this conversion. This is within the skill of the art. See the teachings in U.S. Pat. No. 3,700,623.

Methods of preparing water-soluble poly(diallylamine) polymers and water-soluble poly(diallylamine)-epihalohydrin resins are well known in the art. See U.S. Pat. No. 3,700,623 and Canadian Pat. No. 999,300.

The following example illustrates the preparation of a water-soluble poly(diallylamine) polymer and a water-soluble poly(diallylamine)-epichlorohydrin resin which can be reacted with anionic starch to form a dispersing agent for use in this invention.

EXAMPLE C

1. An aqueous solution of poly(N-methyldiallylamine), a homopolymer, is prepared as follows. A solution of 69.1 parts of N-methyldiallylamine and 197 parts of 20° Be hydrochloric acid in 111.7 parts of demineralized water is sparged with nitrogen to remove air, then treated with 0.55 part of tertiary butyl hydroperoxide and a solution of 0.0036 part of ferrous sulfate in 0.5 part of water. The resulting solution is allowed to polymerize at 60°–69° C. for 24 hours to give a polymer solution containing about 52.1% solids with an RSV of 0.22. The polymer, in aqueous solution, can be used as cationizing resin (d).

2. A solution of poly(N-methyldiallylamine)-epichlorohydrin resin that can be used as cationizing resin (c) is prepared as follows. 122 parts of the above solution is adjusted to pH 8.5 by the addition of 95 parts of 3.8% aqueous sodium hydroxide and then diluted with 211 parts of water and combined with 60 parts of epichlorohydrin. The mixture is heated at 45°–55° C. for 1.35 hours until the Gardner-Holdt viscosity of a sample cooled to 25° C. reaches B+. The resulting solution is stabilized against gelation by adding 25 parts of 20° Be hydrochloric acid and heating at 60° C. until the pH of the solution remains constant at 2.0. The resulting resin solution has a solids content of 20.8% and a Brookfield viscosity of 77 cp. (measured using a Brookfield Model LVF Viscometer, No. 1 spindle at 60 r.p.m. with guard).

Cationizing Resins (e) and (f)

Cationizing resin (f) is a water-soluble poly(alkylenimine)-epihalohydrin resin derived by reacting an epihalohydrin, such as epichlorohydrin, with a water-soluble poly(alkylenimine) cationizing resin (e) such, for example, as poly(ethylenimine). Reaction with epihalohydrin is carried out in a manner similar to that employed in the preparation of water-soluble aminopolyamide-epichlorohydrin resin used as cationizing resin (a).

In general, any poly(alkylenimine) having a molecular weight of at least about 1500 is operable for use in the present invention. The upper limit of the molecular weight is limited only by the solubility of the resin in water. Thus, resins having a molecular weight of 1,000,000 and higher may be used.

The polymerization of alkenimines has been reviewed in Jones, "The Polymerization of Olefin Imines", in P. H. Plesch, ed., The Chemistry of Cationic Polymerization, New York, Macmillan (1963), pages 521–534. Suitable resins for the purpose of this invention are disclosed by Jones and include the polymers of ethylenimine, 2-methylethylenimine, 2-ethylethylenimine, cis-2,3-dimethylethylenimine, trans-2,3-dimethylethylenimine, and 2,2-dimethylethylenimine.

EXAMPLE D

This example illustrates the preparation of fumaric acid fortified rosin. Fumaric acid, 8.5 parts, is adducted, at a temperature of about 205° C. with formaldehyde treated tall oil rosin, 91.5 parts. The fumaric acid dissolves in the fused tall oil rosin and reacts therewith to provide fumaric acid fortified tall oil rosin. After substantially all the fumaric acid has reacted with the tall oil rosin, the fortified rosin is cooled to room temperature (about 23° C.). Substantially all the fumaric acid is in the combined or adducted form; that is, very little, if any, of the fumaric acid is present in the reaction mass in its free form.

EXAMPLE E

This example illustrates the preparation of fumaric acid fortified rosin. Fumaric acid, 14 parts, is adducted at a temperature of about 205° C. with formaldehyde treated tall oil rosin, 86 parts. The fumaric acid dissolves in the fused tall oil rosin and reacts therewith to provide fumaric acid fortified tall oil rosin. After substantially all the fumaric acid has reacted with the tall oil rosin, the fortified rosin is cooled to room temperature (about 23° C.). Substantially all the fumaric acid is in the combined or adducted form.

EXAMPLE F

This example illustrates the preparation of maleic anhydride fortified rosin. Formaldehyde treated tall oil rosin (3000 parts) was heated to 150° C. at which time 2.98 parts concentrated sulfuric acid was added followed by 261 parts maleic anhydride. Twenty minutes after the maleic anhydride was added, additional concentrated sulfuric acid (0.75 part) was added, and 30 minutes after that, an additional 0.75 part sulfuric acid was added. Thirty minutes after that addition, the product was cooled to room temperature. Substantially all the maleic anhydride was in the combined or adducted form.

Anionic Surface Active Agents

As above set forth, one of the essential components of the composition of this invention is an anionic surface active agent. Anionic surface active agents are well known in the art. In carrying out this invention the preferred anionic surface active agent is a soap, such as the sodium soap, of a rosin-base material of which the dispersion is comprised. Other suitable anionic dispersing agents include salts of alkylaryl sulfonic acids, salts of condensed naphthalene sulfonic acids, salts of dialkyl esters of sulfosuccinic acid, salts of alkyl half esters of sulfuric acid, and salts of alkylphenoxy-(polyethyleneoxy)ethanol half esters of sulfuric acid.

The rosin soap can be prepared separately and added to the composition or it can be formed in situ by addition of a base, such as sodium hydroxide, potassium hydroxide or ammonium hydroxide to the composition of which the fortified rosin is comprised. Sodium soap of fortified rosin is the preferred anionic surface active agent and it is preferred that it be formed in situ by addition of sodium hydroxide. This is exemplified in the working examples.

In the case of the alkyl aryl sulfonates, the alkyl group may be linear or branched with ten to eighteen carbon atoms. Various mixtures of these alkylaryl sulfonates can be used. The preferred aryl group is phenyl. Sodium alkylbenzene sulfonates are available commercially. One commercially available product is Ultrawet DS. Ultrawet is a trademark of Arco Chemical Company. Condensed naphthalene sulfonic acid salts are products prepared by condensing formaldehyde with naphthylene followed by sulfonation with sulfuric acid and are available commercially. Commercially available products are Tamol SN and Stepantan A. Tamol is a trademark of Rohm & Haas Company and Stepantan is a trademark of Stepan Chemical Co.

In the case of the salts of dialkyl esters of sulfosuccinic acids, the alkyl groups will include cyclohexyl, hexyl, isobutyl, octyl, pentyl and tridecyl. In the case of the salts of half alkyl esters of sulfuric acid, the alkyl group may have ten to eighteen carbon atoms. In the case of the salts of alkylphenoxy(polyethyleneoxy)ethanol half esters of sulfuric acid, the preferred alkyl group is the nonyl group obtained in propylene trimerization. The polyoxyethylene content can average from one to twenty moles per mole, but an average of four to twelve is preferred.

The anionic starch is cooked prior to its use. Cooking may be by methods well known in the art. Cationization of the starch with the cationizing resin is accomplished either during the cooking of the starch or after the starch has been cooked.

Thus, the starch can be cationized with the cationizing resin by adding the resin to the water in which the starch is to be cooked. The pH of the starch slurry in the thus formed aqueous solution, prior to cooking, should be between about 3 and about 10, preferably between about 5 and about 9. The starch-cationizing resin solution is then cooked or heated at a temperature of about 95° C. to about 100° C. for a period of about 10 minutes to about 30 minutes.

As above set forth, the starch can be cooked first and the cationizing resin, in aqueous solution, added to the cooked starch solution, while hot or after cooling to room temperature, followed by pH adjustment as described above. To hasten reaction, the mixture can then be cooked if desired for about 10 minutes at about 95° C. to 100° C. Before addition of the cationizing resin to the starch solution, it may be desirable to subject the starch solution to high shear, as with an homogenizer, to break down any starch granules remaining after cooking or to reduce the viscosity of the starch solution or both.

Applicable proportions for preparation of the cationized starches used in this invention are, by weight, about 99.5 parts starch (dry basis) and about 0.5 part cationizing resin (dry basis) to 90 parts starch and 10 parts cationizing resin. Thus the range of proportions of starch to cationizing resin will be, by weight, about 99.5:0.5 to 90:10.

EXAMPLE 1

This example illustrates the preparation of a cationized starch dispersing agent and dispersions prepared therefrom. In this example, the anionic starch employed is available commercially as Amiogum 688 from American Maize Products Company. As sold, Amiogum 688 contains about 88% oxidized waxy maize starch and about 12% water. A 28% aqueous solution of the oxidized starch has a viscosity of about 4000 centipoises at 20° C. after cooking or heating for 30 minutes at 95°-100° C. The oxidized waxy maize starch contains about 6.4 milliequivalents of carboxyl per 100 grams of starch.

400 grams of Amiogum 688 (about 88% total solids) was blended with 3,500 milliliters distilled water. The aqueous blend is adjusted to pH 7.0 with an aqueous solution of NaOH and subsequently cooked with stirring at 95° C.–100° C. for 20 minutes. This solution was cooled to room temperature, adjusted to 4,000 grams total weight with distilled water and then homogenized two times at 3,000 p.s.i.g. in a 15 gal/hr. laboratory Manton-Gaulin homogenizer. The final solution has pH 5.8 and 8.9% total solids.

A second batch was prepared as above, except 600 grams starch was used which yields a product having a final total solids of 12.3% and pH 5.8.

A blend of 1555 grams of the first solution and 2961 grams of the second solution was made to give a solution with 11.5% total solids. 2000 grams of this blend was mixed with 62 grams of Kymene 557H (12.5% total solids) and the mixture pH adjusted to 7.0 with aqueous sodium hydroxide. The blend was stirred and heated at 95° C.–100° C. for 10 minutes. After cooling the blend was diluted to 3235 grams total with distilled water to give a final solution with 7.2% total solids and pH 5.6.

975 grams of fortified rosin was dissolved in 675 grams methylene chloride. The fortified rosin used was an 8.5% fumaric acid adduct of formaldehyde treated tall oil rosin. The solution was blended with a mixture of 870 grams of the above prepared starch-cationic resin reaction product solution, 870 grams water, and 27 grams of a 4% aqueous sodium hydroxide. This blend was homogenized two times at 3000 p.s.i.g. and the homogenizate distilled to remove methylene chloride. The final emulsion had 35.7% total solids. Examination with a Coulter Counter apparatus for measuring particle size showed about 38% of the adducted rosin particles to be over 0.4 micron in diameter. About 27% were between 0.4 and 1.0 micron. Thus, about 89% of the fortified rosin particles are 1 micron or smaller in diameter.

EXAMPLE 2

Using the method of Example 1, 2000 grams of the blend of the prepared starch solutions was mixed with 41 grams Kymene 557H (12.5% total solids) to give a solution with 7.3% total solids and pH 5.6.

Again using the method of Example 1, 975 grams of fortified rosin, dissolved in 675 grams methylene chloride, was emulsified in 1305 grams of the above prepared cationized starch solution mixed with 435 grams distilled water and 36 grams 4% aqueous sodium hydroxide. The solvent stripped emulsion has 38.5% total solids. Examination with a Coulter Counter apparatus shows about 48% of the adducted rosin particles to be over 0.4 micron in diameter. About 29 are between 0.4 and 1 micron. Thus, about 81% of the adducted rosin particles are 1 micron and smaller.

EXAMPLE 3

The dispersions of Examples 1 and 2 were diluted to about 3% solids with demineralized water and used for sizing a 120 lb./3000 ft.$^2$ sheet of 100% bleached kraft hardwood pulp refined to 500 CSF. Sizing was carried out with 0.3% size solids at tray pH 4.4-4.5 using 2.5% alum (percentage based on dry pulp). The finished sheets were tested for sizing using the Hercules size tester with 20% formic acid test solution. The following are the test values. The values are the average of five separate tests on the same sized sheet. These results show good sizing of the paper sheets.

| Example | Hercules Size Test, Seconds |
|---|---|
| 1 | 132 |
| 2 | 139 |

EXAMPLE 4

This example illustrates the preparation of cationized starch, cationized with aminopolyamide-epichlorohydrin cationizing resin. 331 grams Amiogum 688 (about 88% solids, about 12% water) and 1600 grams water were placed in a vessel and stirred. During stirring, 72 grams of Kymene 557H (12.5% solids) was added to the contents of the vessel to provide an aqueous composition and the pH thereof was adjusted to 7.0 by addition of a 4% aqueous solution of NaOH. The aqueous composition was heated to 95°-100° C. and maintained at this temperature for 30 minutes. The resulting aqueous cationized starch composition was cooled to room temperature (about 23° C.) and diluted with water to a solids content of 5.9%.

EXAMPLE 5

This example illustrates the preparation of a fortified rosin dispersion using as dispersing agent the cationized starch of Example 4. 975 grams of a fumaric acid fortified formaldehyde treated tall oil rosin (about 7.5% fumaric acid) was dissolved in 675 grams methylene chloride with stirring. 1305 grams of the Example 4 aqueous cationized starch composition was further diluted with 435 grams of water followed by the addition of 36 grams of a 4% aqueous solution of NaOH. This was added to the fortified rosin solution to provide a mixture which was stirred for 2 minutes and then homogenized 2 times at 3000 p.s.i.g. The resulting emulsion was stripped, under vacuum, to remove methylene chloride and to provide an aqueous dispersion of fortified rosin containing cationized starch dispersing agent, and the sodium soap of the fortified rosin (anionic surface active agent), which was formed in situ.

The amount of material that precipitated during stripping was 9.6 grams. The resulting dispersion (2106 grams) had a solids content of 38.4% and a Brookfield viscosity of 84 centipoises.

EXAMPLE 6

Example 5 was repeated with the exception that the fortified rosin employed was a maleic anhydride adducted rosin prepared in accordance with Example F.

The amount of material that precipitated during stripping was 1.1 grams. The resulting dispersion (2361 grams) had a solids content of 38.5% and a Brookfield viscosity of 78 centipoises.

EXAMPLE 7

This example illustrates the preparation of cationized potato starch, cationized with aminopolyamide-epichlorohydrin cationizing resin. 331 grams potato starch (unmodified) and 2000 grams water were placed in a vessel and stirred. Potato starch contains phosphate groups and thus is anionic. Potato starch contains about 3 milliequivalents of phosphate per 100 gram starch. During stirring, 72 grams of Kymene 557H (12.5% solids) was added to the contents of the vessel to provide an aqueous composition and the pH thereof was adjusted to 7.0 by addition of a 4% aqueous NaOH. The aqueous composition was heated to 95°-100° C. and maintained at this temperature for 30 minutes. The resulting aqueous cationized starch composition was cooled to room temperature and diluted with water to a solids content of 6.9%.

EXAMPLE 8

This example illustrates the preparation of a fortified rosin dispersion using as dispersing agent the cationized starch of Example 7. 975 grams of fumaric acid fortified formaldehyde treated tall oil rosin (about 7.5% fumaric acid) was dissolved in 675 grams methylene chloride with agitation. 1305 grams of the Example 7 aqueous cationized starch composition was further diluted with 435 grams of water followed by the addition of 36 grams of 4% aqueous NaOH. This was added to the fortified rosin solution to provide a mixture which was stirred for 2 minutes and then homogenized 2 times at 3000 p.s.i.g. The resulting emulsion was stripped, under vacuum, to remove methylene chloride and to provide an aqueous dispersion of fortified rosin containing cationized starch dispersing agent and anionic surface active agent (the sodium soap of the fortified rosin), which was formed in situ.

The amount of material that precipitated during stripping was 3.7 grams. The resulting dispersion (2348 grams) had a solids content of 38.2%.

EXAMPLE 9

Example 7 was repeated with the exception that there was employed 344 grams oxidized corn starch in place of the 331 grams potato starch. The oxidized corn starch employed was Amaizo 540 available from Americon Maize Products and has about 8 milliequivalents of carboxyl per 100 grams starch.

EXAMPLE 10

This example illustrates the preparation of a fortified rosin dispersion using as dispersing agent the cationized starch of Example 9. 975 grams of fumaric acid fortified formaldehyde treated tall oil rosin (about 7.5% fumaric acid) was dissolved in 675 grams methylene chloride with agitation. 1305 grams of the Example 9 aqueous cationized starch composition was further diluted with 435 grams of water followed by the addition of 36 grams of 4% aqueous NaOH. This was added to the fortified rosin solution to provide a mixture which was stirred for 2 minutes and then homogenized 2 times at 3000 p.s.i.g. The resulting emulsion was stripped, under vacuum, to remove methylene chloride and to provide an aqueous dispersion of fortified rosin containing cationized starch dispersing agent and anionic surface active agent (the sodium soap of the fortified rosin), which was formed in situ.

The amount of material that precipitated during stripping was not measured, but visual determination indicated a very small amount. The resulting dispersion (2274 grams) had a solids content of 38.2% and a Brookfield viscosity of 200 centipoises.

EXAMPLE 11

This example illustrates the preparation of cationized starch. 330 grams Amiogum 688 (about 88% solids, about 12% water) and 1800 grams water were placed in a vessel and stirred. During stirring, 24 grams of Kymene 557H (12.5% solids) was added to the contents of the vessel to provide an aqueous composition and the pH thereof was adjusted to 7.0 by addition of 4% aqueous NaOH. The aqueous composition was heated to 95°-100° C. and maintained at this temperature for 30 minutes. The resulting aqueous cationized starch composition was cooled to room temperature and diluted with water to a solids content of 6.5%.

EXAMPLE 12

This example illustrates the preparation of a fortified rosin dispersion using the cationized starch of Example 11. 975 grams of fumaric acid fortified formaldehyde treated tall oil rosin (about 7.5% fumaric acid) was dissolved in 600 grams methylene chloride with agitation. 1468 grams of the Example 11 aqueous cationized starch composition was added to the fortified rosin solution to provide a mixture which was stirred for 2 minutes and then homogenized 2 times at 3000 p.s.i.g. The resulting emulsion was stripped, under vacuum, to remove methylene chloride whereby there was provided an aqueous dispersion of fortified rosin.

The amount of material that precipitated during stripping was 1.3 grams. The resulting dispersion (2045 grams) had a solids content of 42.9% and a Brookfield viscosity of 43 centipoises.

EXAMPLE 13

Each of the dispersions of Examples 5, 6, 8 and 10 was diluted to about 3% solids with demineralized water and used for sizing paper. Size (0.35% size solids on dry pulp) was added to 50:50 bleached kraft hardwood-bleached kraft softwood pulp containing 0.75% alum. Right after size addition, pH was 5.2-5.3 and total acidity was 44-50 parts per million. Paper sheets (120 lbs./3000 sq. ft.) were prepared from each size-pulp mixture on an experimental paper machine. Size properties were determined on five samples of each sheet using Hercules sizing tester employing 20% formic acid test solution. The following are the test results which are the average of the five separate tests. The size tests show good sizing.

| Example | Hercules Size Test, Seconds (average of 5 separate tests) |
|---|---|
| 5 | 85 |
| 6 | 92 |
| 8 | 129 |
| 10 | 121 |

EXAMPLE 14

The dispersion of Example 12 was diluted to about 3% solids with demineralized water and used to size paper. Size (0.35% size solids on dry pulp) was added to 100% bleached kraft hardwood pulp containing 0.7% alum. Right after size addition, pH was 5.3 and total acidity was 40-45 parts per million. A paper sheet (120 lbs./3000 sq. ft.) was prepared and size properties determined on five separate samples of the sheet as in Example 13. The following tests results are the average of the five separate tests. The test shows good sizing.

| Example | Hercules Size Test, Seconds (average of 5 separate tests) |
|---|---|
| 12 | 138 |

EXAMPLE 15

This example illustrates the preparation of a cationized starch using poly(N-methyldiallylamine)-epichlorohydrin which contains no epoxy groups as the cationizing resin. 185.1 grams Amiogum 688 (about 88% solids, about 12% water) and 1105 grams water were placed in a vessel and stirred. During stirring, 25 grams of a 20.8% solution of poly(N-methyldiallylamine)-epichlorohydrin cationizing resin prepared as in Example C and stabilized against gelation as in Example C was added to the contents of the vessel. Sufficient 4% aqueous sodium hydroxide solution was added to provide a pH of 7. The aqueous composition was heated to 95°-100° C. and maintained at this temperature for 30 minutes. The resulting aqueous cationized starch composition was cooled to room temperature and diluted with water to a solids content of 7.2%. The solution had a pH of 5.8.

EXAMPLE 16

This example illustrates the preparation of an aqueous fortified rosin dispersion using the cationized starch of Example 15. 487.5 grams of fumaric acid fortified formaldehyde treated tall oil rosin (about 7.5% fumaric acid) was dissolved in 300 grams methylene chloride with stirring. 653 grams of the Example 15 aqueous cationized starch composition was further diluted with 217.5 grams of water followed by the addition of 6.8 grams of 4% aqueous NaOH. This was then added to the fortified rosin solution to provide a mixture which was stirred for one minute and then homogenized 2 times at 3000 p.s.i.g. The resulting emulsion was stripped, under vacuum, to remove methylene chloride whereby there was provided an aqueous dispersion of fortified rosin containing cationized starch dispersing agent, and the sodium soap of the fortified rosin (anionic surface active agent) which was formed in situ.

The amount of material that precipitated during stripping was 0.3 gram. The resulting dispersion had a solids content of 38.1% and a Brookfield viscosity of 67 centipoises. The average particle size of the dispersed particles, as determined by the Nano-Sizer apparatus for determining particle size, was 2.5 microns.

EXAMPLE 17

This example illustrates the preparation of cationized starch. 331 grams Amiogum 688 (about 88% solids, about 12% water) and 1800 grams water were placed in a vessel and stirred. During stirring, 72 grams of Kymene 557H (12.5% solids) was added to the contents of the vessel to provide an aqueous composition and the pH thereof was adjusted to 7.0 by addition of 4% aqueous NaOH. The aqueous composition was heated to 95°–100° C. and maintained at this temperature for 30 minutes. The resulting aqueous cationized starch composition was cooled to room temperature (about 23° C.) and diluted with water to a solids content of 5.9%.

EXAMPLE 18

This example illustrates the use of the cationized starch of Example 17 to prepare a fortified rosin dispersion. 325 grams of fumaric acid fortified formaldehyde treated tall oil rosin (about 7.5% fumaric acid) was dissolved in 225 grams methylene chloride with stirring. 435 grams of the Example 17 aqueous cationized starch composition was added to the fortified rosin solution followed by addition of 4.37 grams of 23% aqueous solution of Siponate DS4 anionic surface active agent to provide a mixture which was stirred for 1 minute and then homogenized 2 times at 3000 p.s.i.g. The resulting emulsion was stripped, under vacuum, to remove methylene chloride whereby there was provided an aqueous dispersion of fortified rosin. Siponate DS4 is sodium dodecylbenzene sulfonate. Siponate is a trademark of Alcolac, Inc.

The amount of material that precipitated during stripping was 0.5 gram. The resulting dispersion had a solids content of 43.5% and a Brookfield viscosity of 374 centipoises. Average particle size of the dispersed particles was about 1.3 microns as determined by the Nano-Sizer apparatus.

EXAMPLE 19

This example is similar to that of Example 18 using a different anionic surface active agent. 650 grams of fumaric acid fortified formaldehyde treated tall oil rosin (about 7.5% fumaric acid) was dissolved in 450 grams methylene chloride with stirring. 861 grams of the Example 17 aqueous cationized starch composition was added to the fortified rosin solution followed by addition of 23 grams of 30% aqueous solution of Duponol (SLS) anionic surface active agent to provide a mixture which was stirred for 2 minutes and then homogenized 2 times at 3000 p.s.i.g. The resulting emulsion was stripped, under vacuum, to remove methylene chloride whereby there was provided an aqueous dispersion of fortified rosin. Duponol (SLS) is sodium lauryl sulfate. Duponol is a trademark of E. I. duPont de Nemours & Co.

The amount of material that precipitated during stripping was 13.1 grams. The resulting dispersion had a solids content of 46.0% and a Brookfield viscosity of 5400 centipoises. Average particle size determined, using the Nano-Sizer apparatus, was 0.75 micron.

EXAMPLE 20

Example 19 was repeated with the exception that 20.4 grams 58% aqueous solution of Alipal CO436 anionic surface active agent was used instead of 23 grams of 30% Duponol (SLS) anionic surface active agent. Alipal CO436 is the ammonium salt of sulfate ester of four mole ethylene oxide adduct of nonylphenol. Alipal is a trademark of GAF Corporation.

The amount of material that precipitated during stripping was 0.3 gram. The resulting fortified rosin dispersion had a solids content of 45.2% and a Brookfield viscosity of 2640 centipoises. Average particle size was 0.6 micron, determined using the Nano-Sizer apparatus.

EXAMPLE 21

This example illustrates the preparation of cationized starch, cationized with poly(ethylenimine) cationizing resin. 168 grams Amiogum 688 (about 88% solids, about 12% water) and 1158 grams water were placed in a vessel, heated for 30 minutes at 95°–100° C. and then cooled to room temperature. 1.7 grams of poly(ethylenimine) having a molecular weight of about 50,000 (5.1 grams of a 33% aqueous solution) was added to the cooked starch and the pH of the resulting composition adjusted to 5.7 with sulfuric acid. The resulting aqueous cationized starch composition was diluted with water to a solids content of 7.3%.

EXAMPLE 22

This example illustrates the preparation of a fortified rosin dispersion using as dispersing agent the cationized starch of Example 21. 488 grams of a fumaric acid fortified formaldehyde treated tall oil rosin (about 7.5% fumaric acid) was dissolved in 300 grams methylene chloride with stirring. 653 grams of the Example 21 aqueous cationized starch composition was further diluted with 218 grams of water followed by the addition of 7 grams of a 4% aqueous solution of NaOH. This was added to the fortified rosin solution to provide a mixture which was stirred for 1 minute and then homogenized 2 times at 3000 p.s.i.g. The emulsion was stripped and the amount of material that precipitated during stripping was 0.2 gram. The total solids of the emulsion was 38.7%, the Brookfield viscosity was 51 centipoises and the particle size as determined by the Nano-Sizer apparatus was about 2.1 microns.

EXAMPLE 23

This example illustrates the preparation of cationized starch, cationized with poly(ethylenimine) cationizing resin. 167 grams Amiogum 688 (about 88% solids, about 12% water) and 1146 grams water were placed in a vessel, heated for 30 minutes at 95°–100° C. and then cooled to room temperature. 3.4 grams of poly(ethylenimine) having a molecular weight of about 50,000 (10.2 grams of a 33% aqueous solution) was added to the the cooked starch and the pH of the resulting composition adjusted to 5.8 with sulfuric acid. The resulting aqueous cationized starch composition was diluted with water to a solids content of 7.4%.

EXAMPLE 24

This example illustrates the preparation of a fortified rosin dispersion using as dispersing agent the cationized starch of Example 23. 488 grams of a fumaric acid fortified formaldehyde treated tall oil rosin (about 7.5% fumaric acid) was dissolved in 300 grams methylene chloride with stirring. 653 grams of the Example 23 aqueous cationized starch composition was further diluted with 218 grams of water followed by the addition of 7 grams of a 4% aqueous solution of NaOH. This was added to the fortified rosin solution to provide a mixture which was stirred for 1 minute and then homogenized 2 times at 3000 p.s.i.g. The emulsion was stripped to remove methylene chloride and the amount of material that precipitated during stripping was 0.3 gram. The total solids of the emulsion was 38.1%, the Brookfield viscosity was 37 centipoises and the particle size as determined by the Nano-Sizer apparatus was about 2 microns.

EXAMPLE 25

This example illustrates the preparation of cationized starch, cationized with low molecular weight poly(ethylenimine) cationizing resin. 192 grams Amiogum 688 (about 88% solids, about 12% water) and 1160 grams water were placed in a vessel, heated for 30 minutes at 95°-100° C. and then diluted with water to give 2329 grams of 7.3% solution. To 1160 grams of this solution was added 0.8 gram of neat poly(ethylenimine) having a molecular weight of about 1800 and the pH was adjusted to 5.7 with 10% sulfuric Acid.

EXAMPLE 26

This example illustrates the preparation of a fortified rosin dispersion using as dispersing agent the cationized starch of Example 25. 437 grams of a fumaric acid fortified formaldehyde treated tall oil rosin (about 7.5% fumaric acid) was dissolved in 300 grams methylene chloride with stirring. 652 grams of the Example 25 aqueous cationized starch composition was further diluted with 217 grams of water followed by the addition of 6.8 grams of a 4% aqueous solution of NaOH. This was added to the fortified rosin solution to provide a mixture which was stirred for 1 minute and then homogenized 2 times at 3000 p.s.i.g. The emulsion was stripped to remove the methylene chloride and the amount of material that precipitated during stripping was 1.6 grams. The total solids of the emulsion was 37.1%, the Brookfield viscosity was 31.8 centipoises and the particle size as determined by the Nano-Sizer apparatus was about 2.2 microns.

Dispersing Agents (II)

As above set forth, dispersing agent (II) is a starch, or modified starch, modified by reaction with a cationizing resin, the cationizing resin being a water-soluble polyamine resin containing epoxy groups. While the precise nature of the reaction of starch with the epoxy groups of the polyamine is not fully understood and the invention is not intended to be bound to any particular theory, it is believed to be one of covalent bonding resulting in formation of ether and ester linkages. In addition, there is the likelihood of some ionic bonding.

Examples of cationizing resins are water-soluble poly(diallylamine)-epihalohydrin resins containing epoxy groups, which have been described hereinabove in connection with cationizing resin (c), and water-soluble aminopolyamide-epihalohydrin resins containing epoxy groups.

Water-soluble aminopolyamide-epihalohydrin cationizing resins containing epoxy groups are well-known in the art as are their methods of preparation. The aminopolyamide moiety of the resin is prepared in the same manner as disclosed hereinabove with respect to cationizing resin (a). It is essential, however, that the aminopolyamide moiety contain tertiary amine groups in its chain. This can be accomplished by using as a starting alkylenepolyamine one that contains tertiary amines. Thus, in formula (I) above, R is alkyl. A specific example of such an amine is methyl bis(3-aminopropyl)amine.

Also, the aminopolyamide moiety can be prepared from secondary amines and prior to reaction with an epihalohydrin, such as epichlorohydrin, reacted with an alkylating agent such as methyl chloride whereby the secondary amine nitrogens of the aminopolyamide are alkylated to tertiary amines. This is fully described above with reference to cationizing resin (a).

The aminopolyamide-epihalohydrin resin (wherein the aminopolyamide moiety contains tertiary amine nitrogens) in aqueous solutions will contain halohydrin groups or epoxy groups, depending on solution pH.

Adjustment of solution pH to provide epoxy groups is within the skill of the art and is fully described in U.S. Pat. No. 3,311,594, the disclosure of which is incorporated herein by reference.

Unmodified or modified starch can be used to prepare dispersing agent (II). Unmodified starches include those described above and those modified as by oxidation, acetylation, chlorination, acid hydrolysis, ethylene oxide condensation, and enzymatic action.

The following examples illustrate dispersing agents (II) and their use in preparing fortified rosin dispersions of this invention.

EXAMPLE 27

This example illustrates the preparation of cationized starch. 170 grams of a 3% aqueous solution of poly(N-methyldiallylamine)-epichlorohydrin resin containing epoxy groups (prepared as described in Example C and subsequently activated by addition of aqueous sodium hydroxide whereby the halohydrin groups are converted to epoxy groups) and 1004 grams water were placed in a reaction vessel. While stirring, 185.6 grams Ethylex 3030 starch was added to the vessel to provide an aqueous composition and the pH thereof was adjusted to 7 with 10% HCl. The aqueous composition was heated to 95°-100° C. and maintained at this temperature for 30 minutes. The resulting aqueous cationized starch composition was cooled to room temperature and diluted with water to a solids content of 7.2%.

Ethylex 3030 starch, used in Example 27, as sold, contains about 88.9% ethoxylated corn starch and about 11.1% water.

EXAMPLE 28

This example illustrates the preparation of a fortified rosin dispersion using the cationized starch of Example 27. 487.5 grams of fumaric acid fortified formaldehyde treated tall oil rosin (about 7.5% fumaric acid) was dissolved in 300 grams methylene chloride with stirring. 652.5 grams of the aqueous cationized starch composition of Example 27 was further diluted with 217.5 grams water, followed by addition of 13.5 grams of 4% aqueous NaOH. This was added to the fortified rosin solution to provide a mixture which was stirred for 1 minute and homogenized 2 times at 3000 p.s.i.g. The resulting emulsion was stripped, under vacuum, to remove methylene chloride and to provide an aqueous dispersion of fortified rosin containing the cationized starch as dispersing agent and as anionic surface active agent the sodium soap of the fortified rosin (formed in situ).

The amount of material that precipitated during stripping was 11.9 grams. The dispersion had a solids content of 38.0% and a Brookfield viscosity of 391 centipoises. Average particle size was 1.7 microns (Coulter Counter apparatus).

EXAMPLE 29

This example illustrates the preparation of cationized starch. 170 grams of a 3% aqueous solution of poly(N-methyldiallylamine)-epichlorohydrin resin containing epoxy groups, as used in Example 27, and 1005 grams water were placed in a reaction vessel. While stirring, 185.1 grams Amiogum 688 starch was added to the vessel to provide an aqueous composition. The pH thereof was 9.4. The aqueous composition was heated to 95°–100° C. and maintained at this temperature for 30 minutes. The resulting aqueous cationized starch composition was cooled to room temperature and diluted with water to a solids content of 7.2%. and a pH of 7.3.

EXAMPLE 30

This example illustrates the preparation of a fortified rosin dispersion using the cationized starch of Example 29. 487.5 grams of fumaric acid fortified formaldehyde treated tall oil rosin (about 7.5% fumaric acid) was dissolved in 300 grams methylene chloride with stirring. 652.5 grams of the aqueous cationized starch composition of Example 29 was further diluted with 217.5 grams water, followed by addition of 13.5 grams of 4% aqueous NaOH. This was added to the fortified rosin solution to provide a mixture which was stirred for 1 minute and homogenized 2 times at 3000 p.s.i.g. The resulting emulsion was stripped, under vacuum, to remove methylene chloride and to provide an aqueous dispersion of fortified rosin. The anion surface active agent in the dispersion is the sodium soap of the fortified rosin, formed in situ.

The amount of material that precipitated during stripping was 0.5 gram. The dispersion had a solids content of 38.3% and a Brookfield viscosity of 140 centipoises. Average particle size was 0.8 micron as determined by the Coulter Counter apparatus.

EXAMPLE 31

This example illustrates the preparation of cationized starch. 170 grams of a 3% aqueous solution of poly(N-methyldiallylamine)-epichlorohydrin resin containing epoxy groups, as used in Example 27, and 1004 grams water were placed in a reaction vessel. While stirring, 330 grams Amiogum 688 starch was added to the vessel to provide an aqueous composition and the pH thereof was adjusted to 7.5. The aqueous composition was heated to 95°–100° C. and maintained at this temperature for 30 minutes. The resulting aqueous cationized starch composition was cooled to room temperature and diluted with water to a solids content of 7.3%.

EXAMPLE 32

This example illustrates the preparation of a fortified rosin dispersion using the cationized starch of Example 31. 975 grams of fumaric acid fortified formaldehyde treated tall oil rosin (about 7.5% fumaric acid) was dissolved in 600 grams methylene chloride with stirring. 1305 grams of the aqueous cationized starch composition of Example 31 was mixed with 435 grams water and 5 grams of 4% aqueous NaOH. This was added to the fortified rosin solution to provide a mixture which was stirred for 2 minutes and homogenized 2 times at 3000 p.s.i.g. The resulting emulsion was stripped, under vacuum, to remove methylene chloride and to provide an aqueous dispersion of fortified rosin. The anionic aurface active agent in this dispersion is the sodium soap of the fortified rosin, formed in situ.

The amount of material that precipitated during stripping was 0.6 gram. The dispersion (1833 grams) had a solids content of 36.3% and a Brookfield viscosity of 391 centipoises.

The fortified rosin dispersions of this invention have outstanding stability. When commercially available high free fortified rosin dispersions are allowed to stand undisturbed in a container, there is a tendency for the fortified rosin particles to agglomerate and settle to the bottom where further agglomeration can cause a hard layer of fortified rosin particles to form. This problem can be particularly severe if storage is at elevated temperature (35°–40° C.) such as can be found in some paper mills. There is very little agglomeration and settling in the dispersions of this invention. When settling does occur because some of the particles are too large to remain suspended by Brownian motion, the particles are easily redispersed with gentle agitation.

The dispersions of this invention also have high shear stability. When commercially available high free fortified rosin dispersions are pumped through screens to remove particles formed by surface drying or other agglomeration, there is a tendency for the screens to fill, not so much with these large particles, but by buildup of fortified rosin particles due to the shear forces on the screen wires. This problem can be very severe at 35° C. to 40° C. The dispersions of this invention resist this kind of shear degradation.

Dried spills of the dispersions of this invention are usually easy to clean up. Warm water and mild abrasion, as with a brush, will clean dried spills. Cleanup of dried spills of commercially available high free fortified rosin dispersions requires strong caustic or an organic solvent such as methanol or xylene for removal of the fortified rosin. This is an indication of less agglomeration on drying.

What I claim and desire to protect by Letters Patent is:

1. An aqueous dispersion of fortified rosin consisting essentially of, by weight, (A) from about 5% to about 50% fortified rosin; (B) from about 0.5% to about 10% of at least one water-soluble or water-dispersible cationized starch dispersing agent; (C) from about 0.1% to 4% of at least one anionic surface active agent; and (D) water to 100%, component (B) being selected from (I) an anionic starch modified by reaction with a cationizing resin selected from the group consisting of (a) a water-soluble aminopolyamide-epihalohydrin resin containing no epoxy groups, (b) a water-soluble alkylenepolyamine-epihalohydrin resin, (c) a water-soluble poly(diallylamine)-epihalohydrin resin containing no epoxy groups, (d) a water-soluble poly(diallylamine) resin, (e) a water-soluble poly(alkylenimine) resin, and (f) a water-soluble poly(alkylenimine)-epihalohydrin resin, and (II) starch modified by reaction with a water-soluble cationizing resin containing epoxy groups selected from the group consisting of (a) a water-soluble poly(N-alkyldiallylamine)-epihalohydrin resin containing epoxy groups, and (b) a water-soluble aminopolyamide-epihalohydrin resin containing epoxy groups, the aminopolyamide moiety of which contains tertiary amines, said fortified rosin (A) being the adduct reaction product of rosin and an acidic compound containing the

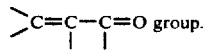

2. An aqueous dispersion of fortified rosin consisting essentially of, by weight, (A) from about 10% to about 40% fortified rosin; (B) from about 1% to about 8% of at least one water-soluble or water-dispersible cationized starch dispersing agent; (C) from about 0.2% to 2% of at least one anionic surface active agent; and (D) water to 100%, component (B) being selected from (I) an anionic starch modified by reaction with a cationizing resin selected from the group consisting of (a) a water-soluble aminopolyamide-epichlorohydrin resin containing no epoxy groups, (b) a water-soluble alkylenepolyamine-epichlorohydrin resin, (c) a water-soluble poly(diallylamine)-epichlorohydrin resin containing no epoxy groups, (d) a water-soluble poly(diallylamine) resin, (e) a water-soluble poly(alkylenimine) resin, and (f) a water-soluble poly(alkylenimine)-epichlorohydrin resin, and (II) starch modified by reaction with a water-soluble cationizing resin containing epoxy groups selected from the group consisting of (a) a water-soluble poly(N-alkyldiallylamine)-epichlorohydrin resin containing epoxy groups, and (b) a water-soluble aminopolyamide-epichlorohydrin resin containing epoxy groups, the aminopolyamide moiety of which contains tertiary amines, said fortified rosin (A) being the adduct reaction product of rosin and an acidic compound containing the

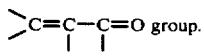

3. An aqueous dispersion of fortified rosin consisting essentially of, by weight, (A) from about 10% to about 40% fortified rosin; (B) from about 1% to about 8% of at least one water-soluble or water-dispersible cationized starch dispersing agent; (C) from about 0.2% to 2% of at least one anionic surface active agent; and (D) water to 100%, component (B) being selected from an anionic starch selected from the group consisting of starches containing phosphate groups and starches containing carboxyl groups modified by reaction with a cationizing resin selected from the group consisting of (a) a water-soluble aminopolyamide-epichlorohydrin resin containing no epoxy groups, (b) a water-soluble alkylenepolyamine-epichlorohydrin resin, (c) a water-soluble poly(diallylamine)-epichlorohydrin resin containing no epoxy groups, (d) a water-soluble poly(diallylamine) resin, (e) a water-soluble poly(alkylenimine) resin, and (f) a water-soluble poly(alkylenimine)-epichlorohydrin resin, said fortified rosin (A) being the adduct reaction product of rosin and an acidic compound containing the

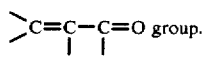

4. An aqueous dispersion of fortified rosin consisting essentially of, by weight, (A) from about 10% to about 40% fortified rosin; (B) from about 1% to about 8% of at least one water-soluble or water-dispersible cationized starch dispersing agent; (C) from about 0.2% to 2% of at least one anionic surface active agent; and (D) water to 100%, component (B) being starch modified by reaction with a water-soluble cationizing resin containing epoxy groups selected from the group consisting of (a) a water-soluble poly(N-alkyldiallylamine)-epichlorohydrin resin containing epoxy groups, and (b) a water-soluble aminopolyamide-epichlorohydrin resin containing epoxy groups, the aminopolyamide moiety of which contains tertiary amines, said fortified rosin (A) being the adduct reaction product of rosin and an acidic compound containing the

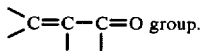

5. The aqueous dispersion of claim 3 wherein component (B) is prepared from a water-soluble aminopolyamide-epichlorohydrin resin containing no epoxy groups.

6. The aqueous dispersion of claim 3 wherein component (B) is a prepared from water-soluble alkylenepolyamine-epichlorohydrin resin.

7. The aqueous dispersion of claim 3 wherein component (B) is prepared from a water-soluble poly(diallylamine)-epichlorohydrin resin containing no epoxy groups.

8. The aqueous dispersion of claim 3 wherein component (B) is prepared from a water-soluble poly(diallylamine) resin.

9. The aqueous dispersion of claim 3 wherein component (B) is prepared from a water-soluble poly(alkylenimine) resin.

10. The aqueous dispersion of claim 3 wherein component (B) is prepared from a water-soluble poly(alkylenimine)-epichlorohydrin resin.

11. The aqueous dispersion of claim 5 wherein the amino-polyamide moiety of the resin is derived from adipic acid and diethylenetriamine and the anionic starch contains carboxyl groups.

12. The aqueous dispersion of claim 5 wherein the amino-polyamide moiety of the resin is derived from adipic acid and diethylenetriamine and the anionic starch contains phosphate groups.

13. The aqueous dispersion of claim 7 wherein the poly(diallylamine) moiety of the resin is poly(N-methyldiallylamine).

14. The aqueous dispersion of claim 7 wherein the poly-(diallylamine) moiety of the resin is poly(N-methyldiallylamine) and the anionic starch contains carboxyl groups.

15. The aqueous dispersion of claim 9 wherein component (B) is prepared from a water-soluble poly(ethylenimine) resin.

16. The aqueous dispersion of claim 4 wherein component (B) is prepared from a water-soluble poly(N- alkyldiallylamine)-epichlorohydrin resin containing epoxy groups.

17. The aqueous dispersion of claim 4 wherein component (B) is prepared from a water-soluble aminopolyamide-epichlorohydrin resin containing epoxy groups, the aminopolyamide moiety of which contains tertiary amines.

18. The aqueous dispersion of claim 16 wherein the poly-(N-alkyldiallylamine) moiety of the resin is poly(N-methyl-diallylamine).

19. The aqueous dispersion of claim 16 wherein the poly-(N-alkyldiallylamine) moiety of the resin is poly(N-methyl-diallylamine) and the starch is an ethyloxylated starch.

20. The aqueous dispersion of claim 16 wherein the poly-(N-alkyldiallylamine) moiety of the resin is poly(N-methyl-diallylamine) and the starch contains carboxyl groups.

21. Any one of the dispersions of claims 1-20 wherein the fortified rosin is extended with a fortified rosin extender in an amount of from about 10% to 100% by weight based on the weight of fortified rosin.

22. Any one of the dispersions of claims 1-20 wherein the fortified rosin has blended therewith unfortified rosin to provide a blend of about 25% to about 95% fortified rosin and about 75% to about 5% unfortified rosin.

23. Any one of the dispersions of claims 1-20 wherein the fortified rosin has blended therewith unfortified rosin and rosin extender to provide a blend of about 25% to about 45% fortified rosin, about 5% to about 50% unfortified rosin, and about 5% to about 50% rosin extender.

* * * * *